(12) United States Patent
Fujii et al.

(10) Patent No.: US 10,707,776 B2
(45) Date of Patent: Jul. 7, 2020

(54) 3-LEVEL POWER CONVERSION CIRCUIT INCLUDING SERIALLY-CONNECTED SWITCHING ELEMENT AND DIODE

(71) Applicant: FUJI ELECTRIC CO., LTD., Kawasaki-shi, Kanagawa (JP)

(72) Inventors: Kansuke Fujii, Machida (JP); Hiromu Takubo, Machida (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 268 days.

(21) Appl. No.: 15/340,186

(22) Filed: Nov. 1, 2016

(65) Prior Publication Data

US 2017/0187304 A1 Jun. 29, 2017

(30) Foreign Application Priority Data

Dec. 25, 2015 (JP) ................................. 2015-254335

(51) Int. Cl.
*H02M 7/487* (2007.01)
*H02M 7/00* (2006.01)
*H02M 1/00* (2006.01)

(52) U.S. Cl.
CPC .......... *H02M 7/487* (2013.01); *H02M 7/003* (2013.01); *H02M 2001/0048* (2013.01); *Y02B 70/1483* (2013.01); *Y02B 70/1491* (2013.01)

(58) Field of Classification Search
None
See application file for complete search history.

(56) References Cited

U.S. PATENT DOCUMENTS

| | | | | |
|---|---|---|---|---|
| 5,506,765 A | * | 4/1996 | Nakata | H02M 7/487 363/132 |
| 8,963,616 B2 | * | 2/2015 | Degener | H02M 7/487 327/424 |
| 2007/0053213 A1 | * | 3/2007 | Brune | H02M 5/4585 363/37 |

(Continued)

FOREIGN PATENT DOCUMENTS

| | | |
|---|---|---|
| JP | 2011078296 A | 4/2011 |
| JP | 5554140 B2 | 7/2014 |
| JP | 5774086 B2 | 9/2015 |

*Primary Examiner* — Adolf D Berhane
*Assistant Examiner* — Henry E Lee, III
(74) *Attorney, Agent, or Firm* — Rabin & Berdo, P.C.

(57) ABSTRACT

A 3-level power conversion circuit, including a high potential terminal configured to receive a high potential from a direct current (DC) power source, a low potential terminal configured to receive a low potential from the DC power source, an intermediate potential terminal configured to receive an intermediate potential from the DC power source, and an alternating current (AC) terminal configured to output an AC, the 3-level power conversion circuit being configured to perform power conversion between the high, low and intermediate potential terminals and the AC terminal. The 3-level power conversion circuit further includes a switching element and a diode connected in series between the intermediate potential terminal and the AC terminal, where the diode, but not the semiconductor switching element, includes a wideband gap semiconductor, and an ampacity of the switching element is greater than an ampacity of the diode.

6 Claims, 5 Drawing Sheets

(56) References Cited

U.S. PATENT DOCUMENTS

| | | | |
|---|---|---|---|
| 2015/0108958 A1* | 4/2015 | Xu | H01L 29/1602 |
| | | | 323/282 |
| 2015/0262892 A1* | 9/2015 | Sugimoto | H01L 22/14 |
| | | | 438/10 |
| 2016/0028224 A1* | 1/2016 | Yamada | H02M 7/487 |
| | | | 363/56.11 |
| 2016/0241030 A1* | 8/2016 | Lacarnoy | H02M 7/487 |
| 2017/0237359 A1* | 8/2017 | Ohnishi | H02M 7/483 |
| | | | 363/131 |

* cited by examiner

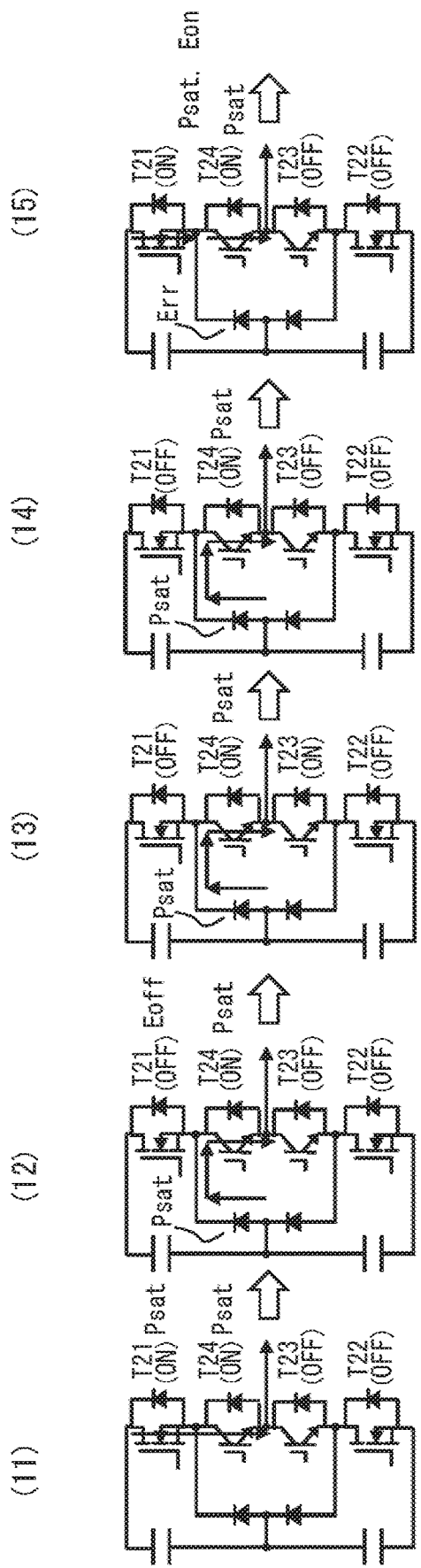

US 10,707,776 B2

3-LEVEL POWER CONVERSION CIRCUIT INCLUDING SERIALLY-CONNECTED SWITCHING ELEMENT AND DIODE

CROSS REFERENCE TO RELATED APPLICATION

This application is based upon and claims the benefit of priority of the prior Japanese patent application No. JP2015-254335, filed on Dec. 25, 2015, the entire contents of which are incorporated herein by reference.

FIELD

The present invention relates to a 3-level power conversion circuit (such as an inverter) in which a silicon carbide (SiC) element and a silicon (Si) element are combined.

BACKGROUND

As described in Patent Documents 1 and 2 below, it has conventionally been known that a 3-level inverter outputs three levels of signals and realizes a reduction in harmonics contained in an output voltage, while 2-level inverter output two levels of signals.

A first example of a conventional 3-level inverter, shown in FIG. 11 and FIG. 16, etc. of Patent Document 1 below, has a configuration in which two series-connected semiconductor switching elements (such as Insulated Gate Bipolar Transistors (IGBTs)) are connected between direct current (DC) high potential terminal P and DC low potential terminal N, alternating current (AC) output terminals are further connected to the connection points of the two semiconductor switching elements, and it is divided so that DC high potential terminal P and DC low potential terminal N are symmetrical with respect to intermediate potential terminal M.

A 3-level inverter is also disclosed, in which a bidirectional switch configured of two IGBTs is disposed between the AC output terminals and intermediate potential terminal M in such a manner that reverse connections to each other are made (the 3-level inverter of this first example will be referred to as a "T-type 3-level inverter" hereinafter" in this description).

In the above case, Patent Document 1 discloses an example in which a silicon (Si) element and a silicon carbide (SiC) element are used for the switching element and the diode of a T-type 3-level inverter.

As a second example of a 3-level inverter, FIG. 1, FIG. 4, etc. of Patent Document 1 below disclose a 3-level inverter in which four Insulated Gate Bipolar Transistors (IGBTs) are connected in a four-series connection between DC high potential terminal P and DC low potential terminal N, the connection points being a result of dividing the four-series connection into two, and in which the AC output terminals are connected, the four-series connection is divided into two, and a clamp diode is connected between the connection points of two IGBTs of two-series connections that are paired by the division into two and intermediate potential terminal M (the 3-level inverter of this second example will be referred to as an "I-type 3-level inverter" hereinafter).

In the above a case, Patent Document 1 discloses an example in which a silicon (Si) element and a silicon carbide (SiC) element are used for the switching element and the diode of an I-type 3-level inverter.

FIG. 1 shows a configuration example of a case where a conventional 3-level power conversion circuit is realized by a T-type 3-level inverter, and is included in Patent Document 2 below. In FIG. 1, it is proposed to make the ampacities of diodes D13 and D14 that are in parallel to semiconductor switching elements (such as Insulated Gate Bipolar Transistors (IGBTs)) T13, T14 smaller than those of semiconductor switching elements (such as Insulated Gate Bipolar Transistors (IGBTs)) T11 and T12.

Note in FIG. 1 that symbols P, N and M denote a DC high potential terminal, a DC low potential terminal and an intermediate potential terminal, similarly to the above, and that 101 and 102 denote capacitors serving as power sources for supplying DC voltages.

However, Patent Document 2 does not describe anything about relationships between the ampacities of diodes D13 and D14 that are in parallel to semiconductor switching elements T13 and T14 and those of semiconductor switching elements T13 and T14.

Because SiC (silicon carbide) devices, which have already been put into practical use as a wideband gap semiconductor, operate at high temperatures and are expensive, it is desirable in view of cost that they be used with a minimum possible chip area.

On the other hand, power conversion devices are required to operate with a higher efficiency, making it necessary to increase a chip area in order to lower a conduction voltage of a diode through which the load current flows.

These requirements are contradictory about whether to emphasize cost or efficiency, and it has conventionally been considered difficult to solve these problems.

Patent Document 1: Japanese Patent No. 5554140
Patent Document 2: Japanese Patent No. 5774086

SUMMARY

It is an object of the present invention to provide a 3-level power conversion circuit that can meet the contradictory requirements of reducing cost by employing a device of SiC and of enlarging the chip area to lower the conduction voltage of the diode.

In order to solve the above problems, when a current flows between the DC neutral point and the AC output in a 3-level power conversion circuit (such as an inverter), the present invention employs:

(1) a configuration in which the current passes through a switching element of Si for an ACSW (a bidirectional switch for performing switching so as to generate an AC) and a diode of SiC in a T-type 3-level power conversion circuit; and (2) a configuration in which the current passes through two switching elements of Si connected to the AC output of the switching elements that are connected between DC high potential terminal P and DC low potential terminal N in a four-series connection and a clamp diode of SiC in an I-type 3-level power conversion circuit.

Configurations (1) and (2) above result in a situation where the conduction loss of the 3-level power conversion device is the sum of the losses of the switching element of Si (such as an IGBT) and the diode of SiC, and thus the conduction loss of diodes of SiC increased for the cost reduction can be reduced by reducing the conduction loss of the switching element of Si.

The 3-level power conversion circuit according to the present invention can reduce the conduction loss of the 3-level power conversion circuit itself by decreasing the ampacity of a diode of SiC so as to reduce the cost and at the same time by increasing the ampacity of the switching element of Si even when the conduction loss of the diode of SiC increases for the cost reduction can be reduced by reducing the conduction loss of the switching element of Si.

BRIEF DESCRIPTION OF THE DRAWINGS

FIG. 5 is a transition diagram showing part of a commutation of the I-type 3-level inverter according to an embodiment of the present invention shown in FIG. 3.

DESCRIPTION OF THE EMBODIMENTS

Detailed explanations will be given for the embodiments of the present invention.

First Embodiment

Figure 2:
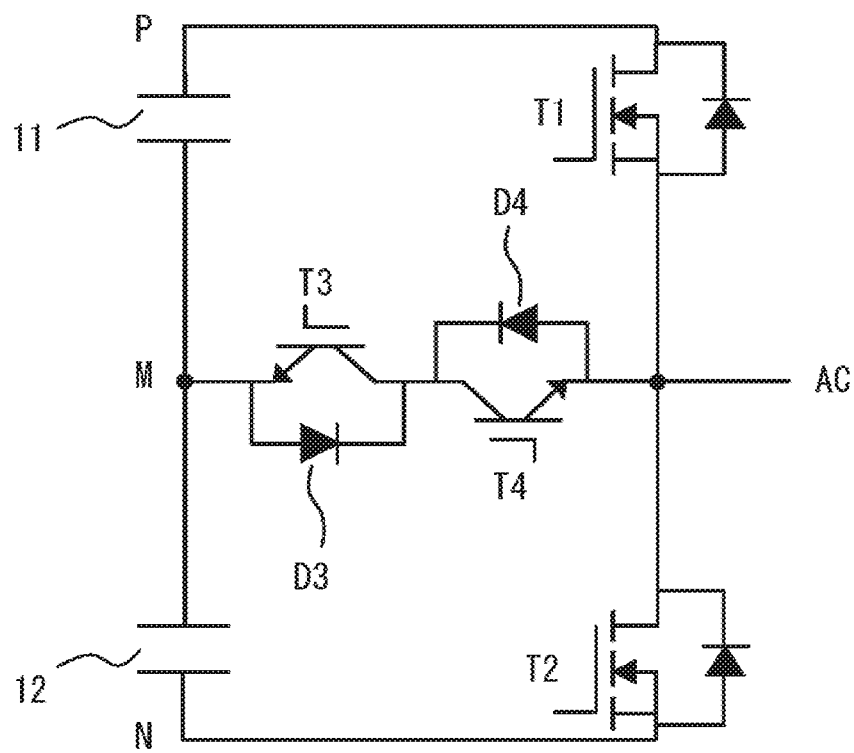
FIG. 2 shows an example of a case where the 3-level power conversion circuit according to an embodiment of the present invention is realized by a T-type 3-level inverter.

FIG. 2 shows an example of a case where the 3-level power conversion circuit according to an embodiment of the present invention is realized by a T-type 3-level inverter.

Figure 1:
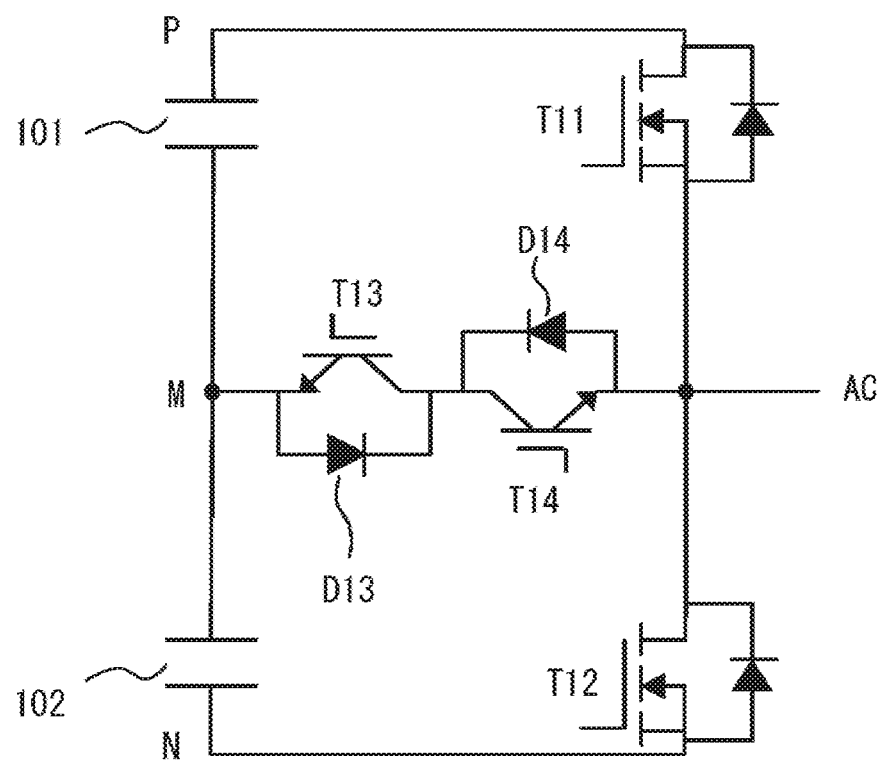
FIG. 1 shows a configuration example of a case where a conventional 3-level power conversion circuit is realized by a T-type 3-level inverter.

Similarly to the T-type 3-level inverter in the conventional example shown in FIG. 1, the T-type 3-level inverter shown in FIG. 2 has a configuration in which two series-connected semiconductor switching elements (such as Metal Oxide Semiconductor Field Effect Transistors (MOSFETs)) T1 and T2 are connected between DC high potential terminal P and DC low potential terminal N, and the connection points of the two semiconductor switching elements T1, T2 are connected to AC output terminals so that DC high potential terminal P and DC low potential terminal N are symmetrical with respect to intermediate potential (DC neutral point) terminal M.

Further, a bidirectional switch configured of two semiconductor switching elements (such as Insulated Gate Bipolar Transistors (IGBTs)) T3, T4 is disposed between the AC output terminal and the intermediate potential terminal M in such a manner that reverse connections to each other are made.

Note in FIG. 2 that symbols P, N and M denote a DC high potential terminal, a DC low potential terminal and an intermediate potential terminal and that AC denotes an AC output terminal and 11 and 12 denote capacitors serving as power sources for supplying DC voltages.

The structural difference between the T-type 3-level inverter according to an embodiment of the present invention shown in FIG. 2 and the conventional T-type 3-level inverter shown in FIG. 1 is that the ampacities of diodes D3 and D4 are made smaller than those of semiconductor switching elements (such as IGBTs) T3 and T4.

Having the ampacities of diodes D3 and D4 smaller than those of semiconductor switching elements T3 and T4 means that the conduction voltage is higher when the same currents flow because diodes D3 and D4 shown in FIG. 2 are configured of multiple chips.

Also, having the ampacities of semiconductor switching elements T3 and 14 be greater than those of diodes D3 and D4 means that the conduction voltage is lower when the same currents flow because semiconductor switching elements T3 and T4 are also configured of multiple chips.

Figure 4:
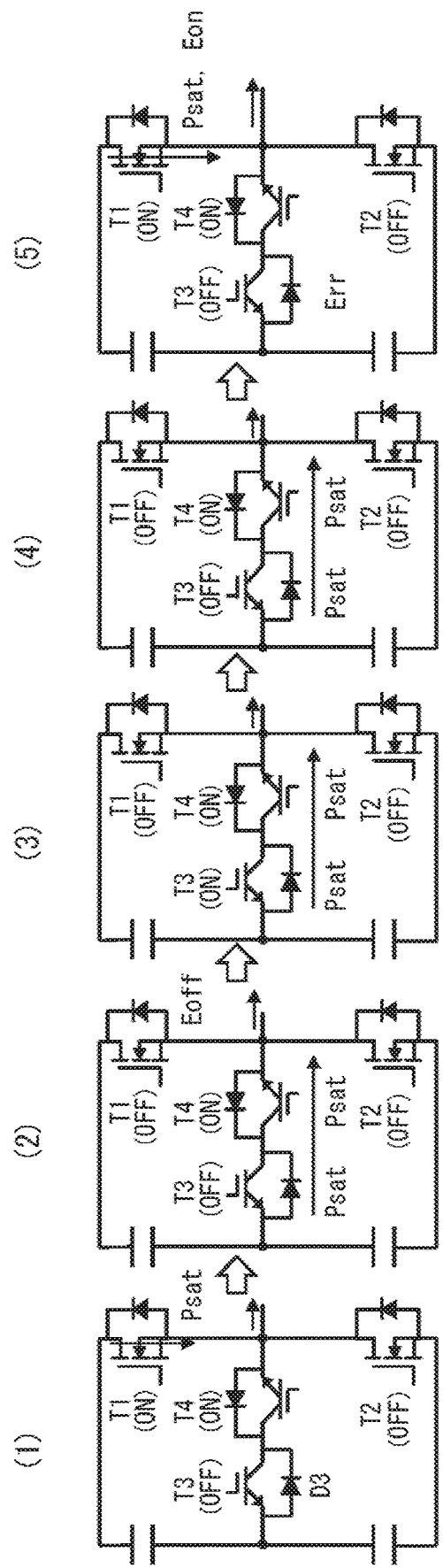
FIG. 4 is a transition diagram showing part of a commutation of the T-type 3-level inverter according to an embodiment of the present invention shown in FIG. 2.

FIG. 4 is a transition diagram showing part of a commutation of the T-type 3-level inverter according to an embodiment of the present invention shown in FIG. 2. Note that FIG. 4 shows part of commutation operations of the T-type 3-level inverter (from T1 to D3 and from T4 to T1).

Explanations will be given for the transition. First, when a load current is flowing to semiconductor switching element T1 with semiconductor switching element T1 turned on as represented by (1), a conduction loss (Psat) occurs in semiconductor switching element T1.

Next, when semiconductor switching element T1 is turned off as represented by (2), a turn-off loss (Eoff) occurs in semiconductor switching element T1, and the load current flows to diode D3 and semiconductor switching element T4, causing conduction losses Psat in diode D3 and semiconductor switching element T4.

Next, even when semiconductor switching element T3, which was in an off state in (1) and (2), is turned on as represented by (3), the occurrence status of losses does not change.

Next, even when semiconductor switching element T3, which was turned on in (3), is turned off as represented by (4), the occurrence status of losses does not change.

Lastly, when semiconductor switching element T1 is turned on as represented by (5), a reverse recovery loss (Err) occurs in diode D3, causing turn-on loss Eon and conduction loss Psat in semiconductor switching element T1.

The commutation operation example shown in FIG. 4 is a partial example thereof, and the operation will be understood by those skilled in the art even if the commutation operation is from T2 to D4 and from T3 to T2).

According to the above explanations, it is possible to reduce conduction loss Psat of semiconductor switching element T4 so as to reduce the cost without increasing the conduction loss of the 3-level power conversion circuit itself, by decreasing the ampacity of diode D3 as much as is permitted by the junction temperature and at the same time by increasing the ampacity of semiconductor switching element T4.

In order to achieve the above effects, it is desirable that a semiconductor switching element (such as a switching element of Si) other than a wideband gap be used between intermediate potential terminal M and AC terminal AC and that a diode of SiC, which is a wideband gap semiconductor element, be used as diodes D3 and D4.

Second Embodiment

Figure 3:
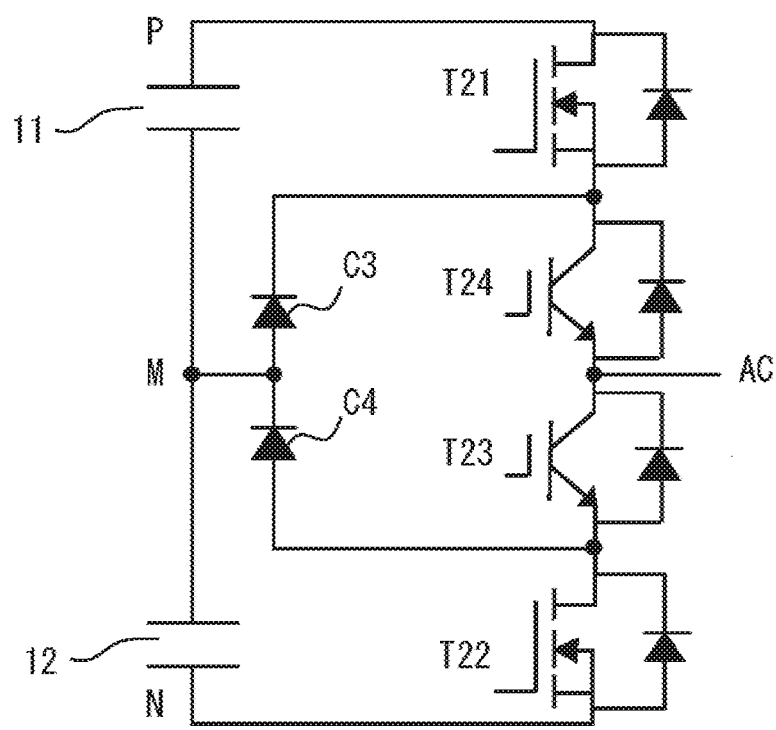
FIG. 3 shows an example of a case where the 3-level power conversion circuit according to an embodiment of the present invention is realized by an I-type 3-level inverter.

FIG. 3 shows an example of a case where the 3-level power conversion circuit according to an embodiment of the present invention is realized by an I-type 3-level inverter.

The I-type 3-level inverter according to an embodiment of the present invention shown in FIG. 3 has, similarly to the I-type 3-level inverter of the above conventional example, a configuration in which four semiconductor switching elements T21-T24 are connected in a four-series connection between DC high potential terminal P and DC low potential terminal N in a MOSFET-IGBT-IGBT-MOSFET manner, the connection points being a result of dividing the four-series connection into two, and in which the AC output terminal are connected, the four-series connection is divided into two, and clamp diodes C3 and C4 are connected between the connection points of two semiconductor switching elements T23 and T24 of two-series connections that are paired by the division into two and intermediate potential terminal M.

Note in FIG. 3 that symbols P, N and M denote a DC high potential terminal, a DC low potential terminal and an intermediate potential terminal and that AC denotes an AC output terminal and 11 and 12 denote capacitors serving as power sources for supplying DC voltages.

The structural difference between the I-type 3-level inverter according to an embodiment of the present invention shown in FIG. 3 and the conventional I-type 3-level inverter is that the ampacities of clamp diodes C3 and C4 are made smaller than those of semiconductor switching elements (such as IGBTs) T24 and T23.

Having small ampacities means that the conduction voltage is greater when the same currents flow because clamp diodes C3 and C4 are configured of multiple chips.

Also, having great ampacities means that the conduction voltage is lower when the same currents flow because semiconductor switching elements T24 and T23 are also configured of multiple chips.

FIG. 5 is a transition diagram showing part of a commutation of the I-type 3-level inverter according to an embodiment of the present invention shown in FIG. 3. Note that FIG. 5 shows part of commutation operations of the I-type 3-level inverter (from T21 and T24 to C3 and T24 and from T24 to T21 and T24).

Explanations will be given for the transition. First, when a load current is flowing to semiconductor switching elements T21 and T24 with semiconductor switching elements T21 and T24 turned on as represented by (11), conduction losses (Psat) occur in semiconductor switching elements T21 and T24.

Next, when semiconductor switching element T21 is turned off as represented by (12), a turn-off loss (Eoff) occurs in semiconductor switching element T21, and the load current flows through clamp diode C3 and semiconductor switching element T24, causing conduction losses Psat in clamp diode C3 and semiconductor switching element T24.

Next, even when semiconductor switching element T23, which was in an off state in (11) and (12), is turned on as represented by (13), the occurrence status of losses does not change.

Next, even when semiconductor switching element T23, which was turned on in (13), is turned off as represented by (14), the occurrence status of losses does not change.

Lastly, when semiconductor switching element T21 is turned on as represented by (15), a reverse recovery loss (Err) occurs in clamp diode C3, causing turn-on loss Eon and conduction loss Psat in semiconductor switching element T21 and also causing a conduction loss (Psat) in semiconductor switching element T24.

The commutation operation example shown in FIG. 5 is a partial example thereof, and the operation will be understood by those skilled in the art even if the commutation operation is from T22 and T23 to C4 and T23, and from T22 to T23.

According to the above explanations, it is possible to reduce conduction loss Psat of semiconductor switching element T24 so as to reduce the cost without increasing the conduction loss of the 3-level power conversion circuit itself, by decreasing the ampacity of diode of the semiconductor switching element T23 as much as is permitted by the junction temperature and at the same time by increasing the ampacity of semiconductor switching element T24.

Note that in order to achieve the above effects, it is desirable that a clamp diode connected between intermediate potential terminal M and AC terminal AC be a diode of SiC and that two switching elements connected between intermediate potential terminal M and AC terminal AC be a semiconductor device of Si.

INDUSTRIAL APPLICABILITY

The present invention can be applied to an inverter, such as a solar battery inverter, that converts DC electric power into AC so as to output it.

What is claimed is:

1. A 3-level power conversion circuit, comprising:
   a high potential terminal configured to receive a high potential from a direct current (DC) power source;
   a low potential terminal configured to receive a low potential from the DC power source;
   an intermediate potential terminal configured to receive an intermediate potential from the DC power source;
   an alternating current (AC) terminal configured to output AC, the 3-level power conversion circuit being configured to perform power conversion between the high, low and intermediate potential terminals and the AC terminal; and
   a switching element and a diode connected in series between the intermediate potential terminal and the AC terminal, wherein
   the diode, but not the semiconductor switching element, includes a wideband gap semiconductor, and
   an ampacity of the switching element is greater than an ampacity of the diode.

2. The 3-level power conversion circuit according to claim 1, wherein
   the 3-level power conversion circuit is a T-type 3-level power conversion circuit,
   the switching element includes a bidirectional switch that is a semiconductor device of silicon (Si), and
   the diode is a semiconductor device of silicon carbide (SiC).

3. The 3-level power conversion circuit according to claim 1, wherein
   the 3-level power conversion circuit is an I-type 3-level power conversion circuit,
   the switching element is a semiconductor device of silicon (Si), and
   the diode is a semiconductor device of silicon carbide (SiC).

4. The 3-level power conversion circuit according to claim 3, wherein
   a chip area of the switching element is greater than a chip area of the diode.

5. The 3-level power conversion circuit according to claim 2, wherein
   a chip area of the switching element is greater than a chip area of the diode.

6. The 3-level power conversion circuit according to claim 1, wherein
   a chip area of the switching element is greater than a chip area of the diode.

* * * * *